W. C. STEVENS.
PORTABLE BUFFER.
APPLICATION FILED DEC. 14, 1912.
1,112,865.
Patented Oct. 6, 1914.
2 SHEETS—SHEET 1.
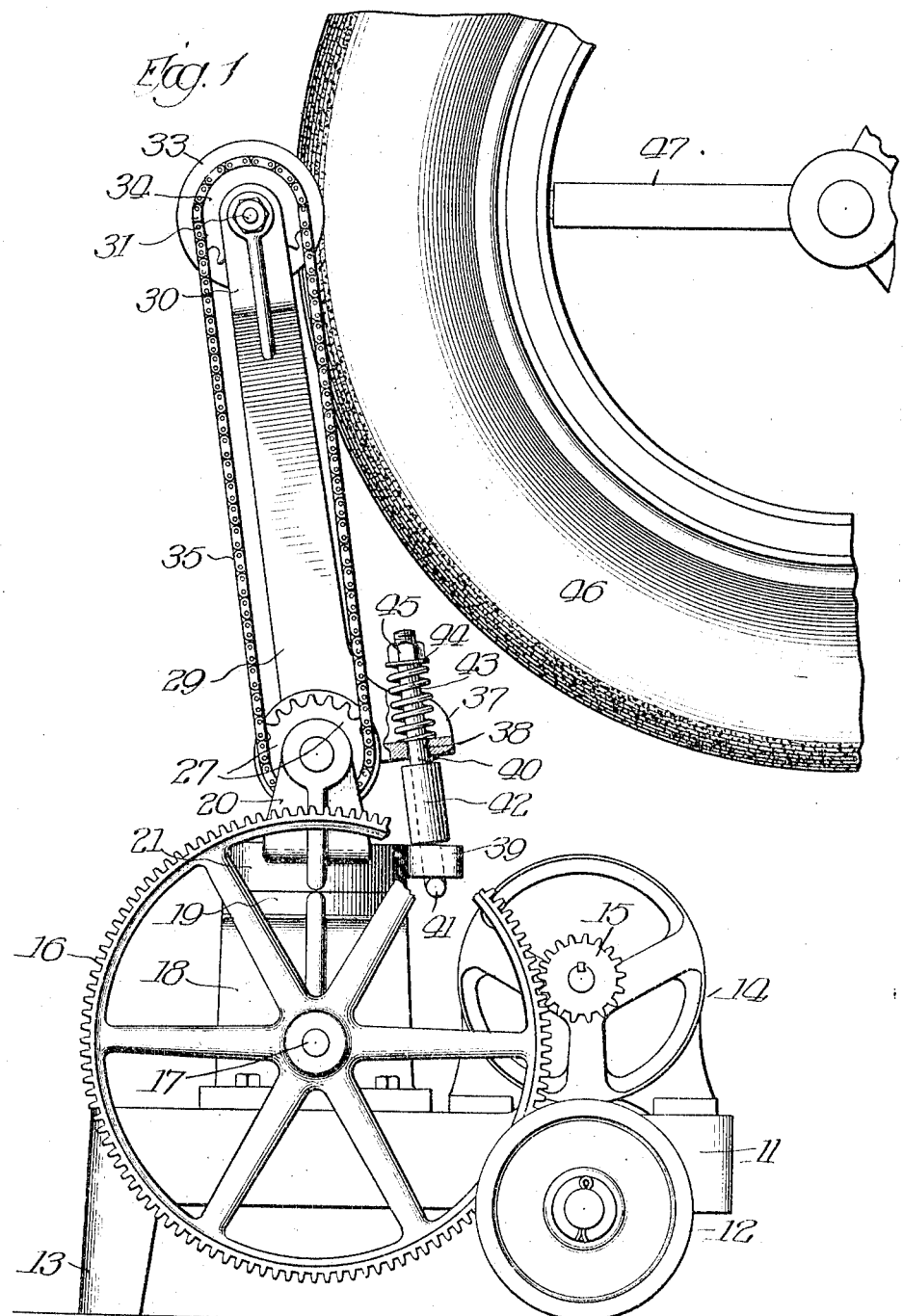

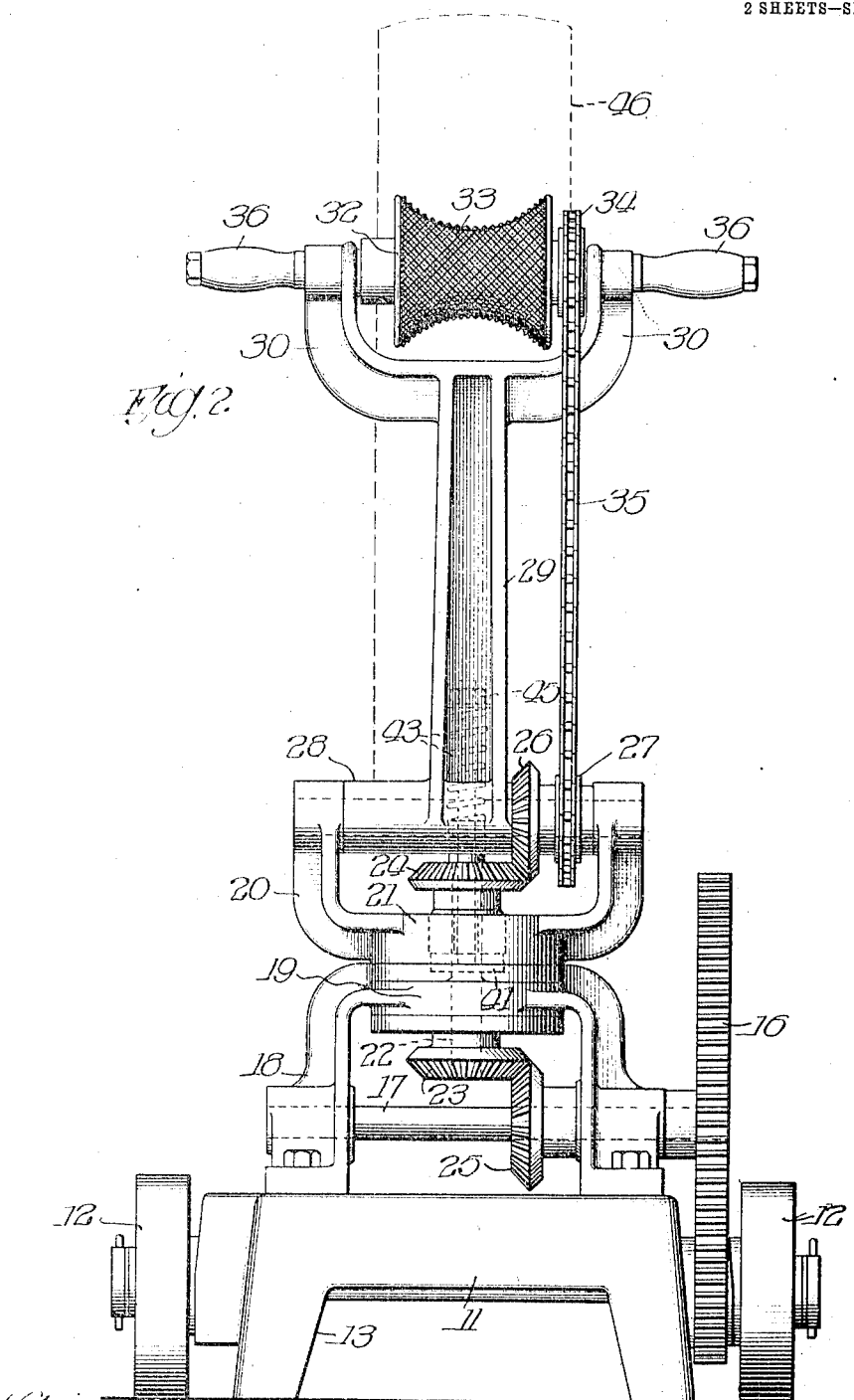

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

PORTABLE BUFFER.

1,112,8.. Specification of Letters Patent. Patented Oct. 6, 1914.

Application filed December 14, 1912. Serial No. 736,730.

*To all whom it may concern:*

Be it known that I, WILLIAM C. STEVENS, a citizen of the United States, residing at Akron, in the county of Summit and State of Ohio, have invented certain new and useful Improvements in Portable Buffers, of which the following is a specification.

My invention relates to buffing or abrading machines and particularly to those adapted to the manufacture of pneumatic tires. In the making of such tires, after the inner layers of rubber-impregnated fabric are built up and a layer of rubber superposed thereon, it is usual to roughen or buff the surface of such rubber layer before applying thereto the breaker strip of fabric which is to separate the underlying layers from the outer wear layer or tread, such roughening serving to cause a more intimate adhesion or union of the two layers. Heretofore it has been usual to buff the tire at this stage of manufacture by the manual use of an abrading tool, such as a coarse rasp, a tedious and costly operation. By my invention, on the contrary, the buffing is mechanically done at a great saving of time and a consequent increase of capacity of the plant whereby the cost of manufacture is considerably reduced and the uniform excellence of the work enhanced. My invention also provides a portable machine of this character adapted to be readily brought into position for use upon the tire while upon the forming core and without removal from the frame or spider upon which it is supported during the steps of manufacture preceding and following the buffing operation.

In order that the invention and the manner of its use may be readily understood, I have in the accompanying drawings illustrated a preferred embodiment of the same wherein, Figure 1 is a side elevation of the machine shown in operative relation to a tire; and Fig. 2 is a rear elevation of the same.

The machine as illustrated and forming the basis of a detailed description comprises a base 11 supported at one end upon a pair of wheels 12, 12 and at the opposite end upon a foot 13 after the manner of a truck. Upon the base above the wheels 12 is mounted a motor 14 driving by means of a pinion 15 the drive gear 16 mounted upon the drive shaft 17 which is journaled in a pedestal 18 provided in its upper portion with a swivel plate 19. Supported by the pedestal 18 is a yoke 20 having its lower connecting portion formed as a swivel plate 21 overlying and coöperating with the swivel plate 19. The two swivel plates are bored to serve as bearings for the shaft 22 which carries a pair of miter gears 23 and 24, the shaft 22 also serving as a swivel pin about which the swivel plates 19 and 21 may turn. The miter gear 23 is in mesh with a similar gear 25 fixed upon the drive shaft 17 while the miter gear 24 is in mesh with a similar gear 26 fixed upon a shaft which is journaled in the yoke 20 and carries a sprocket 27.

A collar 28 is mounted between the two arms of the yoke 20 and incloses the shaft 27, the collar 28 having upstanding therefrom an arm 29 bifurcated in its upper portion. In the branches 30, 30 of said arm is journaled a buffer shaft 31 and upon the shaft 31 is fixed a buffing roller 32 of spool shape, the surface thereof being longitudinally concave and roughened to present, as indicated at 33, an abrading surface. A sprocket 34 is likewise fixed upon the shaft 31 between the branches 30, 30 and a sprocket chain 35 traverses the sprockets 27 and 34 as a driving medium. Handles 36, 36 are carried by the branches 30 by means of which the buffer is manipulated. At the lower portion of the arm 29 the said arm is provided with an angular lateral projection 37 apertured at 38, and the swivel plate 21 is likewise provided with a slotted projection 39 underlying the projection 37. A connecting pin 40 having a T-head 41 is mounted within the slot and aperture of the two projections with its head 41 underlying the projection 39 and with its upper portion extending above the projection 37. A spacing sleeve 42 is threaded upon the pin 40 between the two projections while a compression spring 43 is disposed upon the upper end of the pin above the projection 37, the lower end of the spring bearing upon the said projection and the upper end of the spring bearing upon a washer 44 held in adjusted position upon the pin by means of a nut 45. It will be seen that the spring 43 bearing downwardly upon the projection 37 of the arm 29 tends to swing the arm and buffing roller to the right as shown in Fig. 1, while the function of the spacing sleeve 42 is to serve as a stop preventing the spring from swinging the arm beyond a vertical position.

The operation is as follows: The device may be readily moved upon the wheels 12 into operative relation to the tire 46 mounted upon the spider 47, the foot 13 being dropped into contact with the floor after the device has been wheeled into such position that the buffing roller 32 bears against the periphery of the tire with sufficient force to compress the spring 43 and bring the swinging arm 29 sufficiently out of the vertical to maintain a yielding pressure of the roller against the tire under the influence of the spring, as indicated in Fig. 1. The foot 13 resting upon the floor serves as a brake to prevent the further movement of the wheels so that the position of the device with reference to the tire is maintained. The motor having been started the buffing roller is rapidly revolved by means of the interposed transmission media and the spider 47 being likewise in rotation the buffing roller travels progressively over the tire periphery roughening the same by the action of its abrading surface. The operator grasping the handles 36, is enabled to control the yielding pressure exerted by the spring 43 and can also rotate the arm 29 upon its longitudinal axis about the swivel pin 22 so as to bring the roller to bear not only upon the extreme periphery of the tire but also around the side face of the same to such an extent as may be desired. When the operation is completed the device may be thrown out of action by stopping the motor or by grasping the machine frame and moving the same backward to bring the roller out of engagement with the tire.

It will thus be seen that I provide a self-contained motor driven buffing machine which is readily transportable from place to place, and as readily retained temporarily in the place of use, said machine arranged to exert sustained yielding pressure of the buffing roller upon the tire and at the same time completely under the control of the operator to vary the pressure and to bring the roller to bear upon different portions of the tire face. It will be readily apparent also that while I have shown with a considerable degree of particularity features of construction entering into the preferred embodiment of the invention, such constructional features are subject to modification within a wide range without departure from the essence of the invention and the sacrifice of its material advantages.

I claim:

1. In a machine of the character described, the combination of a base, a motor mounted thereon, a pedestal mounted upon the base, a substantially vertical arm swiveled upon the pedestal and pivoted to swing in a vertical plane, a buffing roller carried by the arm, a driving connection between the motor and the roller, the arm provided with a lateral projection, a spring connection between the projection and a fixed portion of the device tending to swing the arm to press the roller against the tire, and a handle carried by the arm whereby to control the action of the spring and the movement of the arm about its swivel connection, substantially as described.

2. In a machine of the character described, the combination of a base, a motor mounted thereon, a pedestal mounted upon the base, a drive shaft journaled in the pedestal, a yoke, a transmission shaft journaled in the yoke, a shaft forming a swivel connection between the pedestal and yoke, intermeshing gears carried by the three shafts, a driving connection between the drive shaft and motor, an arm pivoted in the yoke for movement in a vertical plane, a roller carried by the arm and having an abrading surface, a driving connection between the transmission shaft and the roller, yielding means tending to swing the arm to cause the roller to bear upon the tire, and manually operable means to control the swinging of the arm and to turn the same upon its swivel connection, substantially as described.

3. In a machine of the character described, the combination of a base, a motor mounted thereon, a pedestal mounted upon the base, a drive shaft journaled in the pedestal, a yoke, a transmission shaft journaled in the yoke, a shaft forming a swivel connection between the pedestal and yoke, intermeshing gears carried by the three shafts, a driving connection between the drive shaft and motor, an arm pivoted in the yoke for movement in a vertical plane, a roller carried by the arm and having an abrading surface, a driving connection between the transmission shaft and the roller, the arm and yoke having laterally extending projections, a spring connecting said projections and tending to swing the arm to press the roller against the tire, and a handle carried by the arm whereby to control the action of the spring and to turn the arm about its vertical axis upon its swivel connection, substantially as described.

WILLIAM C. STEVENS.

Witnesses:
 HOWARD J. ADAMS,
 A. G. PARTRIDGE.